US012649248B2

(12) United States Patent
DeStories et al.

(10) Patent No.: US 12,649,248 B2
(45) Date of Patent: Jun. 9, 2026

(54) APPARATUS AND METHODS TO REDUCE IMPACT OF ROBOT COLLISION AND/OR AVOID ROBOT COLLISION

(71) Applicant: The Boeing Company, Chicago, IL (US)

(72) Inventors: Jason G. DeStories, Broomfield, CO (US); Michael R. Mercer, Mesa, AZ (US); Ashley B. Bruno, Mesa, AZ (US); Curtis R. Estevo, Mesa, AZ (US); Jeffrey Peebles, Mesa, AZ (US); Basilio Penuelas, Mesa, AZ (US); Blaze Mitanoski, Mesa, AZ (US)

(73) Assignee: The Boeing Company, Arlington, VA (US)

( * ) Notice: Subject to any disclaimer, the term of this patent is extended or adjusted under 35 U.S.C. 154(b) by 301 days.

(21) Appl. No.: 18/066,787

(22) Filed: Dec. 15, 2022

(65) Prior Publication Data

US 2024/0198528 A1 Jun. 20, 2024

(51) Int. Cl.
*B25J 19/06* (2006.01)
*B25J 9/16* (2006.01)
*B25J 13/08* (2006.01)

(52) U.S. Cl.
CPC ............. *B25J 19/06* (2013.01); *B25J 9/1674* (2013.01); *B25J 9/1676* (2013.01); *B25J 13/087* (2013.01); *B25J 13/088* (2013.01)

(58) Field of Classification Search
CPC ...... B25J 9/1676; B25J 13/087; B25J 13/088; B25J 9/1674; B25J 19/06
See application file for complete search history.

(56) References Cited

U.S. PATENT DOCUMENTS

| | | | | |
|---|---|---|---|---|
| 4,644,237 A | * | 2/1987 | Frushour | ............... B25J 9/1676 367/909 |
| 6,236,553 B1 | * | 5/2001 | Widell | ................. H01H 47/005 361/189 |
| 10,644,619 B2 | * | 5/2020 | Yamamoto | .............. H02P 29/04 |
| 2012/0265325 A1 | * | 10/2012 | Rohs | .................. G05B 19/4062 700/79 |
| 2014/0163733 A1 | * | 6/2014 | Sadowski | ............. A47L 9/2852 700/255 |
| 2016/0031078 A1 | * | 2/2016 | Kapoor | .................. B25J 9/0081 700/258 |

(Continued)

FOREIGN PATENT DOCUMENTS

| | | | | |
|---|---|---|---|---|
| DE | 102008062978 A1 | * | 6/2010 | ........... B25J 9/1641 |
| KR | 101320970 B1 | | 10/2013 | |

*Primary Examiner* — Abby Lin
*Assistant Examiner* — Karston G. Evans
(74) *Attorney, Agent, or Firm* — Hanley, Flight & Zimmerman, LLC

(57) ABSTRACT

Apparatus and methods to reduce impact of robot collision and/or avoid robot collision are described herein. An example collision detection device includes a housing to be coupled to an automated robot, a sensor in the housing, a relay in the housing, the relay to be electrically coupled to a safety circuit of the automated robot, and circuitry in the housing. The circuitry is to determine a parameter value based a signal from the sensor, compare the parameter value to a threshold value, and, in response to the parameter value satisfying the threshold value, trigger the relay to stop the automated robot.

20 Claims, 12 Drawing Sheets

(56) References Cited

U.S. PATENT DOCUMENTS

| | | | | |
|---|---|---|---|---|
| 2016/0089790 A1* | 3/2016 | Wang | | B25J 9/1694 |
| | | | | 700/255 |
| 2017/0189131 A1* | 7/2017 | Weir | | B25J 9/1689 |
| 2018/0345498 A1* | 12/2018 | Müncher | | B25J 19/027 |
| 2019/0147655 A1* | 5/2019 | Galera | | G06T 15/20 |
| | | | | 345/419 |
| 2019/0221037 A1* | 7/2019 | Sugaya | | G06T 13/20 |
| 2020/0086497 A1* | 3/2020 | Johnson | | B25J 9/1666 |
| 2020/0398426 A1* | 12/2020 | Morioka | | B25J 9/1694 |
| 2021/0284461 A1* | 9/2021 | Ditner | | H02P 5/68 |

* cited by examiner

104

200

Housing

204

300

Sensor
(accelerometer)

308

Battery

Display

302

310

124

Collision
detection circuitry

Swtich

Power
line

User
input
device

304

306

206

Relay

Relay

Output
device(s)

312

126

To safety
circuity

104

200

Housing

204

900

Sensor
(Microphone)

308

Battery

Display

302

310

124

User
input
device

Collision
detection circuitry

Swtich

Power
line

206

304

306

Relay

Relay

Output
device(s)

312

126

To safety
circuity

Figure 13:
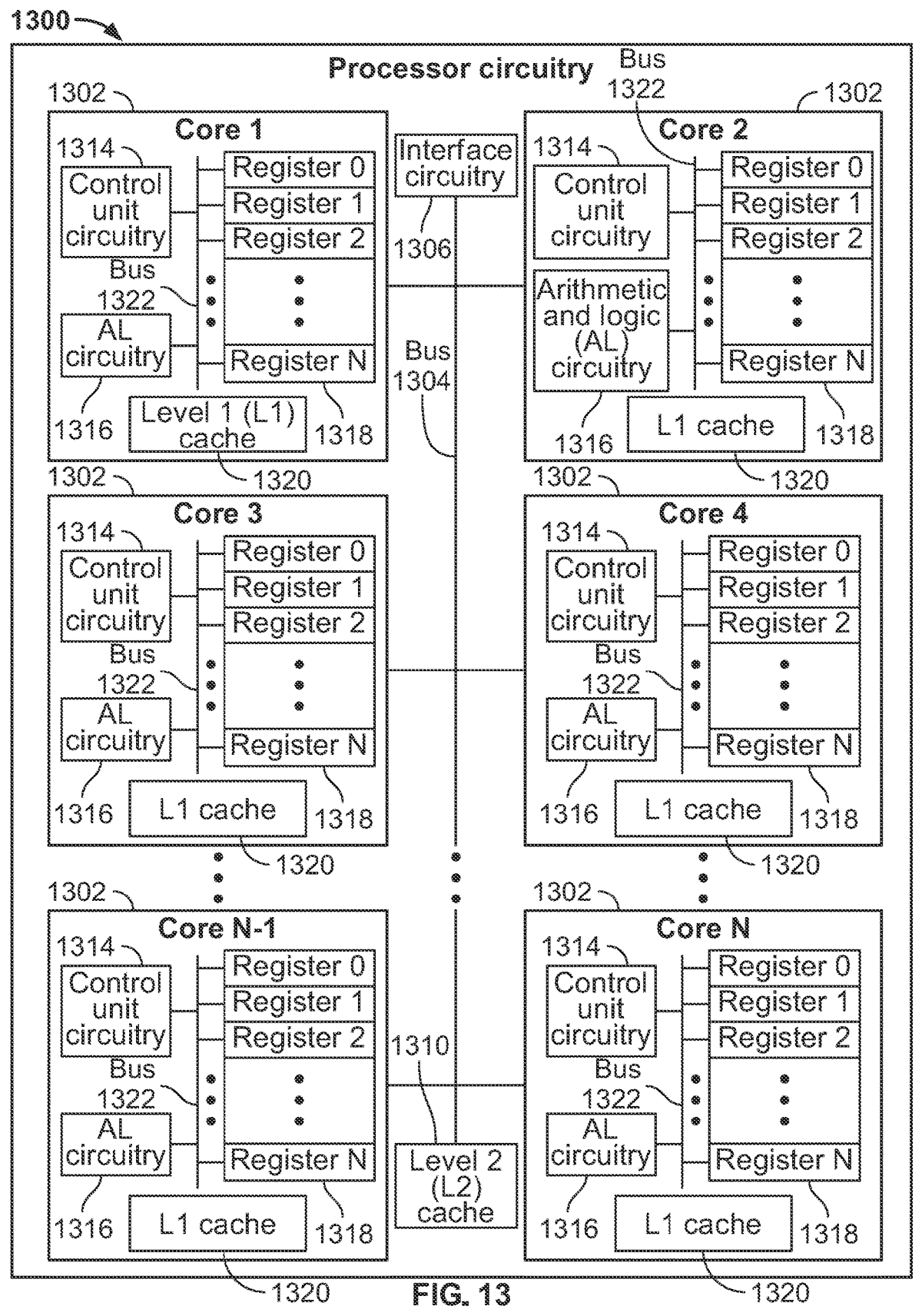

1300

Processor circuitry

Bus 1322

1302

Core 1

1314

Control unit circuitry

Bus 1322

AL circuitry

1316

Register 0
Register 1
Register 2
⋮
Register N

Level 1 (L1) cache

1318

1320

Interface circuitry

1306

Bus 1304

1302

Core 2

1314

Control unit circuitry

Arithmetic and logic (AL) circuitry

1316

Register 0
Register 1
Register 2
⋮
Register N

L1 cache

1318

1320

1302

Core 3

1314

Control unit circuitry

Bus 1322

AL circuitry

1316

Register 0
Register 1
Register 2
⋮
Register N

L1 cache

1318

1320

1302

Core 4

1314

Control unit circuitry

Bus 1322

AL circuitry

1316

Register 0
Register 1
Register 2
⋮
Register N

L1 cache

1318

1320

1302

Core N-1

1314

Control unit circuitry

Bus 1322

AL circuitry

1316

Register 0
Register 1
Register 2
⋮
Register N

L1 cache

1318

1320

1310

Level 2 (L2) cache

1302

Core N

1314

Control unit circuitry

Bus 1322

AL circuitry

1316

Register 0
Register 1
Register 2
⋮
Register N

L1 cache

APPARATUS AND METHODS TO REDUCE IMPACT OF ROBOT COLLISION AND/OR AVOID ROBOT COLLISION

FIELD OF THE DISCLOSURE

This disclosure relates generally to robots and, more particularly, to apparatus and methods reduce impact of robot collision and/or avoid robot collision.

BACKGROUND

Robots are being used more and more to automate various processes in different environments, such as manufacturing, research and development, testing, etc. Some processes still require some level of human oversight. Therefore, a new variety of robotics has emerged referred to as collaborative robotics ("cobots"). Cobots are designed to facilitate human-robot interaction. In particular, these robots generally operate around and/or in conjunction with humans.

BRIEF DESCRIPTION OF THE DRAWINGS

FIG. 13 is a block diagram of an example implementation of the processor circuitry of FIG. 12.

In general, the same reference numbers will be used throughout the drawing(s) and accompanying written description to refer to the same or like parts. The figures are not to scale.

Figure 1:
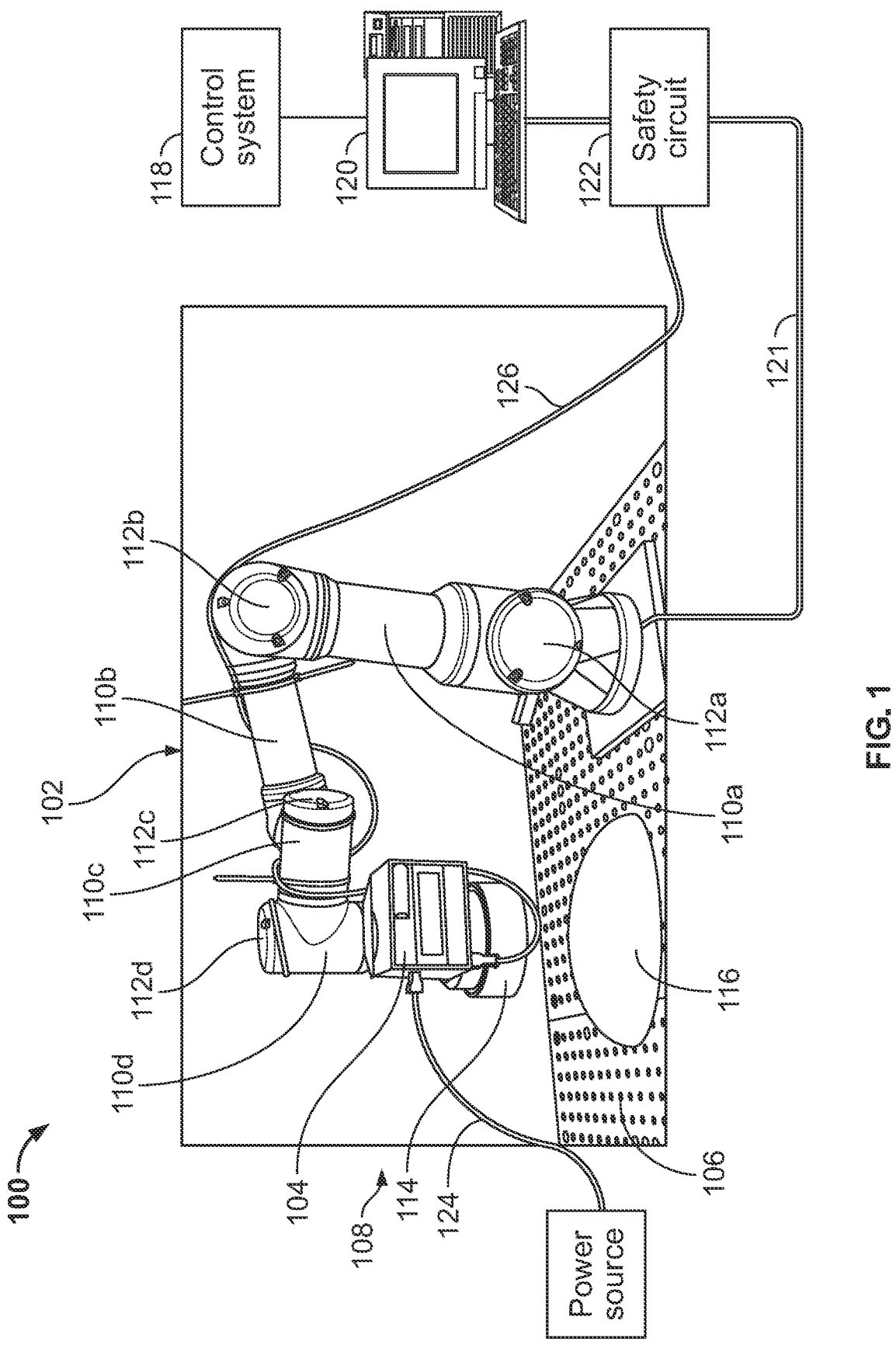
FIG. 1 illustrates an example environment including an example robot and an example collision detection device used in conjunction with the example robot.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Automated robots are used in many environments to perform one or more processes. For example, robots are commonly used in manufacturing facilities, assembly lines, for testing parts or components, for packaging, etc. Using robots to automate certain processes is beneficial because robots can repeat the same process with a high degree of accuracy and speed. Automated robots require rigid safety mechanisms to keep people and/or objects safe. These mechanisms typically rely on physical barriers or light curtains to detect if someone or something is in the workspace of the robot.

Some processes are relatively sensitive and/or complex and therefore require some human interaction and/or monitoring. A new variety of robots has emerged, referred to as collaborative robots ("cobots"). Cobots are robots that are intended for direct human-robot interaction within a shared space and/or operate in a space near humans. Cobots come in many different forms and capabilities. Cobots are useful because they typically have internal safety features that enable direct human interaction, and they are relatively easy to program and implement. This makes them ideal for introducing automation into complex industries, such as aerospace.

As mentioned above, cobots typically include safety features that allow for human interaction, unlike traditional robots. These safety features may monitor for a possible unintentional collision and can stop the robot. For example, the cobot may inadvertently collide with a person and/or unintended object. In known cobots, this is determined by power and force limiting (PFL) techniques that measure current provided to the robot motors, which can be indicative of power or force on the motors. However, these internal safety features are not sensitive enough for certain processes, and often require a moderate amount of force to trigger a stop. As a result, the cobot may collide with a fragile/sensitive object before the robot is stopped, and/or the cobot may collide with a person before the robot is stopped.

Disclosed herein are example apparatus and methods that reduce impact of a collision of an automated robot with an object and/or person. The example apparatus and methods can be used with a cobot, for example. The example apparatus and methods disclose herein can detect an unintended collision and stop and/or slow the robot. The example apparatus and methods disclosed herein are more sensitive than known internal safety features. As such, the example methods and apparatus can stop a robot more quickly.

Disclosed herein is an example collision detection device that can be coupled to a moving part of a robot, such as a cobot. The example collision detection device is add-on device that detects collision by actively tracking or monitoring a certain parameter, such as acceleration. The collision detection device includes a sensor, such as accelerometer, processor circuitry (e.g., a microprocessor), and a relay. In some examples, these components are disposed in a housing that is coupled to the robot (e.g., to a moving arm of the robot). The accelerometer measures acceleration in the X, Y, and Z directions. The processor circuitry calculates acceleration values and/or changes in the acceleration values (referred to as jerk values) for the X, Y, and Z directions and compares these values to respective threshold values. Jerk is the rate of change or derivative of acceleration. If one of these values exceeds its respective threshold value, the processor circuitry can trigger the robot to stop. Most cobots are programmed to accelerate at constant values, so the cobot ramps up to a certain speed and the ramps down to a stop. Therefore, an acceleration that is above the nominal value and/or a spike in acceleration (jerk) is indicative of the cobot colliding with an object or person. Therefore, if the collision detection device detects an abnormal acceleration and/or spike in acceleration, the collision detection device can stop the robot.

The example collision detection device is independent of or agnostic to the control system of the cobot. In other words, the example collision detection device does not receive input from the control system regarding the programmed movements of the robot. Instead, the collision detection device measures certain parameters based on its internal sensors. These parameters are much sensitive than known internal safety features of the robot. The relay of the collision detection device is connected to a safety circuit of the robot, which is used for emergency and/or safeguard stops. If the collision detection device detects a possible collision, the collision detection device triggers (e.g., opens) the relay, which triggers the safety circuit to stop or shut down the robot. Therefore, the example collision detection device can be easily implemented in connection with any robot, because the device does not need to be integrated into the programming of the robot. This make it easier for the device to be installed and used with various robots.

In some examples disclosed herein, the example collision detection device can include a microphone in addition to or as an alternative to the accelerometer. The microphone measures sound or noise within the surrounding environment. If a collision occurs, it typically generates a loud audible noise. Therefore, the processor circuitry can monitor for a spike in sound energy and trigger the stop. Additionally, this enables a person to trigger a stop before a collision occurs. For example, a person may be on the other side of the room relative to the robot and notice a collision is about to occur. The person may yell or clap loudly, which triggers the processor circuitry to initiate the stop. Therefore, the examples disclosed herein can also be used to avoid a collision before it happens.

FIG. 1 illustrates an example environment 100 in which the example collection detection apparatus and methods disclosed herein can be implemented. The example environment 100 may be a facility for manufacturing, assembly, testing, and/or another purpose. FIG. 1 shows an example automated robot 102 that is used to automate or perform a certain process in the environment 100. FIG. 1 also shows an example collision detection device 104 used in connection with the robot 102. As disclosed in further detail herein, the collision detection device 104 can detect if the robot 102 collides with an object and immediately stop the robot 102. The example collision detection device 104 is more sensitive than known safety features implemented in the control system of the robot 102. As such, the example collision detection device 104 improves safety and reduces or prevents unintended damage to objects around the robot 102. Additionally, in some examples, the collision detection device 104 can stop the robot 102 before the collision occurs. Therefore, while the device 104 is referred to as a collision detection device 104, it is understood that a collision may not actually occur.

In this example, the robot 102 is implemented as an articulated arm robot. The robot 102 is coupled or mounted to a table 106 and is moveable around a workspace 108. In the illustrated example, the robot 102 includes a plurality of arm segments 110a-110d that are connected by motorized joints 112a-112d. The robot 102 has an end effector 114, which is a device at the end of the robot 102 used to interact with the environment 100. In this example, the end effector 114 is an antenna. The motorized joints 112a-112d can be activated to move the end effector 114 around the workspace 108. In this example, the robot 102 is used to perform an antenna testing process on an object 116. The robot 102 moves the end effector 114 (the antenna) around the object 116 and monitors certain electromagnetic properties. For example, the object 116 may be a Radome or nose cone of an aircraft with an antenna inside. The antenna of the end effector 114 measures various electromagnetic properties and/or signals output by the antenna in the object 116. Therefore, in this example, the robot 102 is considered a contactless robot, because the robot 102 is not supposed to contact the object 116 during the intended process. Instead, the robot 102 merely moves the end effector 114 around the object 116 to measure the electromagnetic properties and signal strength. If the robot 102 inadvertently contacts the object 116, it could damage the object 116, which can be expensive to repair and/or replace.

In other examples, the robot 102 can be implemented in connection with another type of processor. The end effector 114 can be used to carry any type of device or tool such as a gripper, a drill bit, a sensor, etc. associated with the process. Further, in some examples, the robot 102 can perform a process that is intended to contact an object, such as for picking up and moving an object, performing a subtractive manufacturing process (e.g., drilling, sanding, etc.), etc.

In the illustrated example, the environment 100 includes a control system 118 to control the robot 102 to perform the various movements and operations during the automated process. For example, the control system 118 sends signals for activating the various motorized joints 112*a*-112*d* to cause the end effector 114 to move along a certain path. In this example, the control system 118 is implemented by an example computer 120 (e.g., a desktop computer). However, in other examples, the robot 102 can be controlled by other types of electronic devices and/or controllers (e.g., a programmable logic controller (PLC), a laptop, a smart phone, etc.). The control system 118 is electrically coupled to and controls the robot 102 via a cable 121 (e.g., one or more wires, an ethernet cord, a USB cord, etc.).

In the illustrated example, the environment 100 includes a safety circuit 122 for the robot 102, which is sometimes referred to as an emergency stop circuit or safeguard circuit. If an incident occurs, the control system 118 can trigger the safety circuit 122, which cuts off power to the robot 102, thereby stopping the robot 102.

In the illustrated example, the collision detection device 104 is coupled to the robot 102 and moves with the robot 102 during the process performed by the robot 102. In this example, the collision detection device 104 is coupled to the arm 110*d* near the end effector 114. However, in other examples, the collision detection device 104 can be couple to another portion of the robot 102. As shown in FIG. 1, a power line 124 connects the collision detection device 104 to a power source (e.g., a wall outlet). Further, a cable 126 (e.g., one or more wires, an ethernet cord, a USB cord, etc.) couples the collision detection device 104 to the safety circuit 122. As disclosed in further detail herein, the collision detection device 104 includes a sensor, such as an accelerometer. The accelerometer measures acceleration of the collision detection device 104 and, thus, of the robot 102 during the process. The collision detection device 104 analyzes the acceleration values and/or jerk values (the change in acceleration) to determine if a collision has occurred. In particular, most robots are programmed to increase or decrease speed at a constant or near constant acceleration. This enables the robot to slowly ramp up to a certain speed and then slowly ramp down to a certain speed or stop. The collision detection device 104 monitors for acceleration values outside of the nominal range and/or spikes in the jerk values, which are indicative of a collision. If the collision detection device 104 determines a collision has occurred, the collision detection device 104 triggers the safety circuit 122, which stops the robot 102. In some examples, the collision detection device 104 is configured to trigger the safety circuit 122 by creating an open circuit at the safety circuit 122. In other examples, the collision detection device 104 can trigger the safety circuit 122 by sending a signal to the safety circuit 122.

Therefore, the collision detection device 104 is independent of or agnostic to the control system 118 associated with the robot 102. This enables the collision detection device 104 to be easily implemented in connection with any new or existing robot, because the collision detection device 104 does not need to be integrated into the control system 118. Instead, the collision detection device 104 operates independently of the control system 118 but can still stop the robot 102 via the safety circuit 122 if a collision is detected. In some examples, the control system 118 has internal safety features that trigger a stop event using known PFL techniques. Therefore, in some examples, the collision detection device 104 is considered a secondary or supplemental safety mechanism.

While in this example the robot 102 is implemented as an articulated arm robot, it is understood the example collisions detection apparatus and methods disclosed herein can be implemented in connection with any other type of robot, such a mobile robot, a cartesian robot, a gantry robot, a selective compliance assembly robot arm (SCARA), etc. The example collision detection apparatus and methods can also be implemented in connection with a robot that is intended to contact an object.

Figure 2:
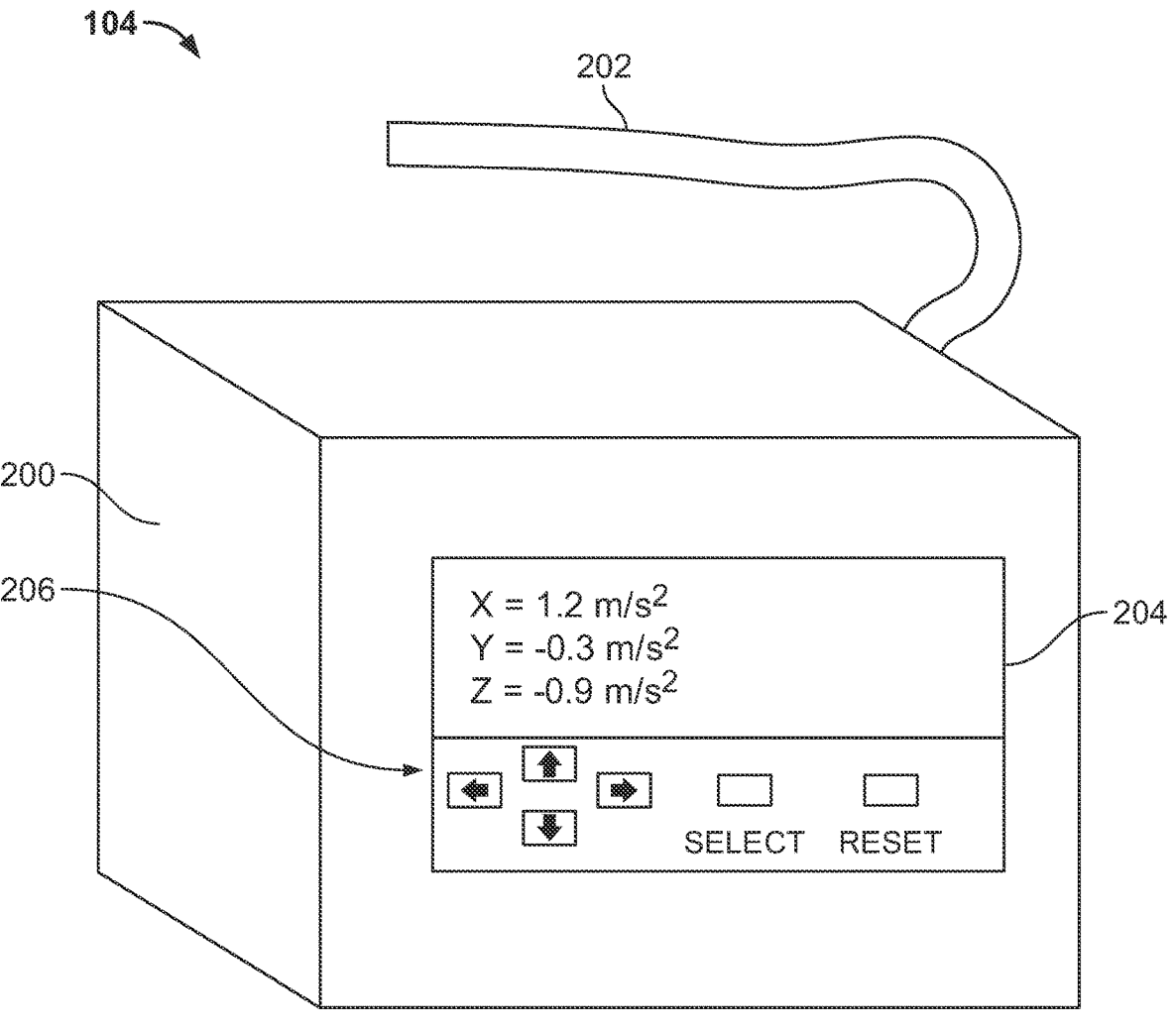
FIG. 2 is an isolated view of the example collision detection device of FIG. 1.

FIG. 2 is an enlarged view of the example collision detection device 104. The collision detection device 104 includes a housing 200, such as a container or box. In this example, the housing 200 is cube shaped. In other examples, the housing 200 can be shaped differently. In some examples the housing 200 is constructed of plastic. In other examples, the housing 200 can be constructed of other materials.

As described above, the collision detection device 104 is to be coupled to the robot 102. In this example, the collision detection device 104 includes a strap 202 to couple the housing 200 to the robot 102. One end of the strap 202 is coupled to the housing 200. The strap 202 can be wrapped around the robot 102, and a distal end of the strap 202 can be coupled (e.g., via a locking mechanism) to the housing 200, thereby coupling (e.g., fastening, securing) the housing 200 to the robot 102. In some examples, the housing 200 and/or the strap 202 includes hook and loop fasteners (e.g., Velcro), a ratchet section, or another locking mechanism. In other examples, the collision detection device 104 can be coupled to the robot 102 using other chemical and/or mechanical techniques (e.g., threaded fasteners, zip-ties, clips, welding, adhesives).

In the illustrated example of FIG. 2, the collision detection device 104 includes a display 204. The display 204 can be implemented by any type of a display, such as an LED display. The display 204 can present various information, as disclosed in further detail herein. In this example, the display 204 is coupled to (e.g., mounted) and/or otherwise displayed along a side of the housing 200. In some examples, the collision detection device 104 includes a user input device 206. In this example the user input device 206 is implemented by a plurality of physical buttons. A user can press the buttons to input to display certain information, input various commands into the collision detection device 104, and/or otherwise interact with the collision detection device 104. In other examples, the user input device 206 can be implemented by other types of user input devices, such as a touchscreen, a dial, a switch, a keyboard, a mouse, etc.

Figure 3:
FIG. 3 is a block diagram of the example collision detection device of FIG. 1 including an example accelerometer.

FIG. 3 is a block diagram of the example collision detection device 104. In the illustrated example, the collision detection device 104 includes a sensor 300, collision detection circuitry 302, and first and second relays 304, 306. In this example, the sensor 300, the collision detection circuitry 302, and the first and second relays 304, 306 are disposed or located in the housing 200. The collision detection device 104 also includes the display 204 and the user input device 206, which can be mounted and/or disposed along a side of the housing 200, which was shown in FIG. 2. The electronic components of the collision detection device 104 receive power from the power line 124. In some examples, the power line 124 connects to a port on the housing 200. Additionally or alternatively, in some examples, the collision detection device 104 can include a battery 308 (e.g., a battery pack) that provides power to the electronic components. In some examples, the collision detection device 104 includes a switch 310 to turn on or off the collision detection device 104. In some examples, the switch 310 is located on a side of the housing 200.

In the illustrated example, the first and second relays 304, 306 are electrically coupled via the cable 126 to the safety circuit 122 (FIG. 1) of the robot 102. If one or both of the relays 304, 306 is/are triggered, this creates an open or closed circuit (depending on the configuration) at the safety circuit 122 that stops the robot 102. In some examples, the first and second relays 304, 306 are configured as normally closed relays. Therefore, if one or both of the relays 304, 306 is opened (referred to as triggered), this creates an open circuit at the safety circuit 122 and that causes the robot 102 to stop. However, in other examples, the first and second relays 304, 306 can be configured as normally open relays, which are triggered close to cause the robot 102 to stop. In illustrated example, the collision detection device 104 includes two relays for redundancy, in case one of the relays 304, 306 fails. However, in other examples, the collision detection device 104 may include only one of the relays (e.g., only the first relay 304).

The sensor 300 measures a parameter, and the collision detection circuitry 302 analyzes the parameter to determine whether a collision has occurred and trigger the relays 304, 306. In this example, the sensor 300 is implemented as an accelerometer, referred to herein as the accelerometer 300. However, in other examples, such as disclosed in further detail in connection with FIGS. 9 and 10, the collision detection device 104 can include other types of sensors. In this example, the accelerometer 300 is a 3-axis accelerometer that measures acceleration in the X, Y, and Z directions. The accelerometer 300 outputs signals to the collision detection circuitry 302 indicative of the acceleration in the X, Y, and Z directions. In some examples, the collision detection circuitry 302 is implemented by a microprocessor. The collision detection circuitry 302 computes or determines one or more parameter values based on the signals from the accelerometer 300. These parameter values may include the acceleration values for the X, Y, and Z directions and/or the change/slope in acceleration values, also known as jerk, for each of the X, Y, and Z directions. The collision detection circuitry 302 compares the parameter value(s) to respective threshold values. If the collision detection circuitry 302 determines one or more of the parameter value(s) has/have met or satisfied a respective threshold value (e.g., exceeded the threshold value), the collision detection circuitry 302 triggers the relays 304, 306, which triggers the safety circuit 122 to stop the robot 102. In other words, in response to the parameter value satisfying the threshold value, the collision detection circuitry 302 triggers the relays 304, 306 to stop the automated robot 102.

In the illustrated example, the collision detection device 104 includes one or more output device(s) 312. In some examples, the output device(s) 312 include a buzzer and a light (e.g., an LED light). The collision detection circuitry 302 may active the output device(s) 312 when a stop is triggered, which provides additional indicators to a user that a stop event has occurred. In other examples, the output device(s) 312 can include other types of output devices.

Figure 4:
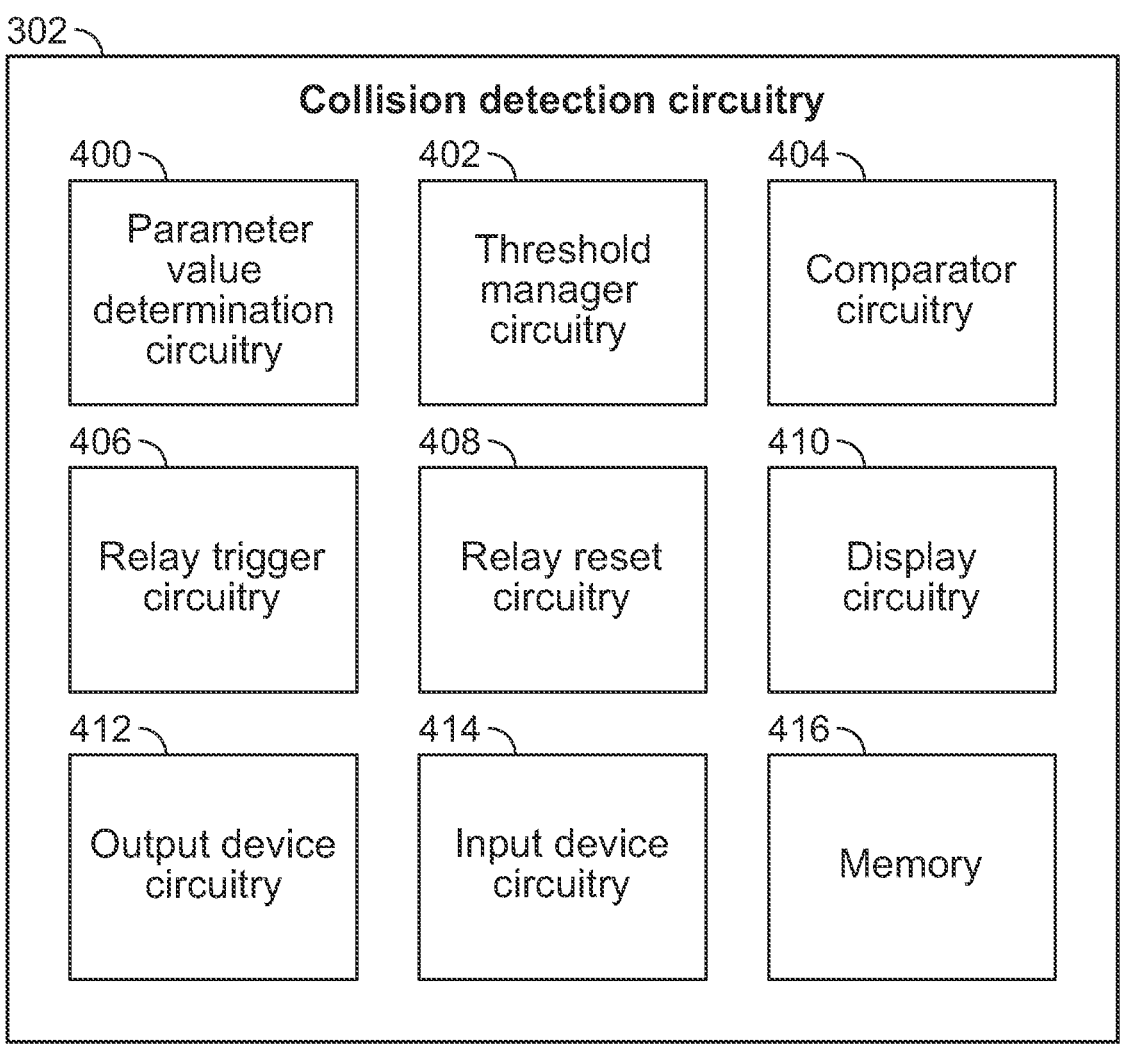
FIG. 4 is a block diagram of example collision detection processor circuitry implemented in the example collision detection device of FIG. 1.

FIG. 4 is a block diagram of the example collision detection circuitry 302. The collision detection circuitry 302 of FIG. 4 may be instantiated (e.g., creating an instance of, bring into being for any length of time, materialize, implement, etc.) by processor circuitry such as a central processing unit executing instructions. Additionally or alternatively, the collision detection circuitry 302 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

In the illustrated example, the collision detection circuitry 302 includes parameter value determination circuitry 400, threshold manager circuitry 402, comparator circuitry 404, relay trigger circuitry 406, relay reset circuitry 408, display circuitry 410, output device circuitry 412, and input device circuitry 414. In some examples, the circuitry is instantiated by processor circuitry executing instructions and/or configured to perform operations such as those represented by the flowchart of FIG. 11. In the illustrated example, the collision detection circuitry 302 includes memory 416. However, in other examples, the memory 416 can be separate from the collision detection circuitry 302.

In the illustrated example, the parameter value determination circuitry 400 calculates or determines one or more parameter values based on signals from the accelerometer 300. In this examples, the parameter values include acceleration values for the X, Y, and Z directions. These acceleration values can be used to determine if a collision has occurred. For example, if an acceleration value spikes outside of a normal or nominal range, it may be indicative of a collision of the robot 102. Additionally or alternatively, in some examples, the parameter values can include jerk values for the X, Y, and Z directions. Jerk is the slope or derivative of acceleration. Therefore, jerk represents the change in acceleration, which can be indicative of a collision. In some examples, the parameter value determination circuitry 400 determines the parameters at a certain frequency, such as the frequency of the signals from the accelerometer 300. For example, the accelerometer 300 may output measurements at a frequency of 16 Mhz. Therefore, the parameter value determination circuitry 400 can calculate the acceleration and/or jerk values at a frequency of 16 Mhz. In some examples, the parameter value determination circuitry 400 stores the parameter values in the memory 416.

In the illustrated example, the threshold manager circuitry 402 determines or sets the threshold values for each of the parameter values. For example, the threshold manager circuitry 402 may set threshold values for the each of the X, Y, and Z acceleration values and jerk values. The threshold values for each of the X, Y, Z acceleration values may be the same or different. Similarly, the threshold values for each of the X, Y, Z jerk values may be the same or different. In some examples, the threshold values include positive and negative values for movements in the positive and negative directions. Therefore, in some examples, the threshold values may include a range (e.g., acceleration between −2 m/s$^2$ and +2 m/s$^2$). In other examples, the negative parameter values are converted to positive values and compared to the same threshold values. In some examples, the threshold manager circuitry 402 stores the threshold values in the memory 416. In some examples, the threshold values can be adjusted, as disclosed in further detail herein.

In the illustrated example, the comparator circuitry 404 compares the parameter values to their respective threshold values. For instance, the comparator circuitry 404 compares the X acceleration value to an X threshold value, compares the Y acceleration value to a Y threshold value, and so forth. If the comparator circuitry 404 determines that one or more of the parameter values satisfies or meets its respective threshold, the relay trigger circuitry 406 triggers (e.g., opens) the first and second relays 304, 306. This trips the safety circuit 122 (FIG. 1) and causes the robot 102 to stop. As used herein, satisfying or meeting a threshold can correspond to meeting and/or exceeding a threshold. However, in other examples, the system can be configured such that satisfying or meeting a threshold is meeting and/or falling below a threshold value. In some examples, in addition to or as an alternative to triggering the relays 304, 306, the relay trigger circuitry 406 records the event in the memory 416.

In some examples, after the relays 304, 306 have been triggered, the relay reset circuitry 408 resets the relays 304, 306 after a period of time, such as 30 seconds. Therefore, after a short period of time, the relays 304, 306 are reset, which closes the safety circuit 122 and enables the robot 102 to continue with the programmed process. Additionally or alternatively, the relay reset circuitry 408 can reset the relays 304, 306 based on input from the user (e.g., by pressing a button on the user input device 206). As such, the user can verify the robot 102 is in a safe state before starting the robot 102 again.

Figure 5:
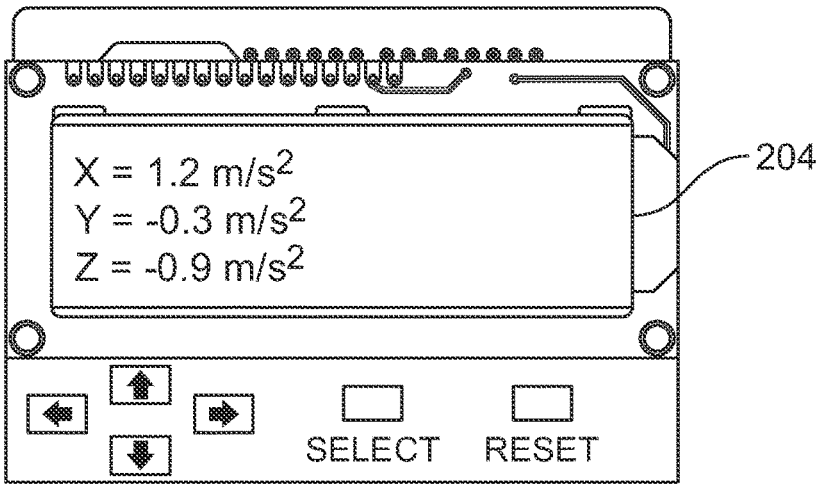
FIG. 5 shows an example display of the example collision detection device of FIG. 1 showing example acceleration values.

In the illustrated example, the display circuitry 410 controls the output of the display 204. The display circuitry 410 can cause the display 204 to present various information. In some examples, during operation, the display circuitry 410 causes the display 204 to display the current X, Y, and Z acceleration values output by the parameter value determination circuitry 400 in substantially real time. This enables a user to see the live acceleration values as the robot 102 is moving around during its programmed process. For example, FIG. 5 shows an example in which the display 204 is displaying acceleration values for the X, Y, and Z directions. Additionally or alternatively, the display 204 can display the jerk values for the X, Y, and Z directions.

Figure 6:
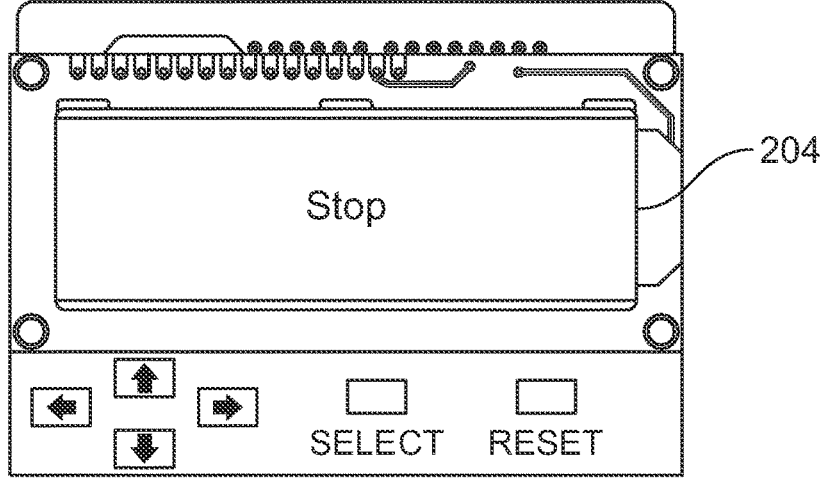
FIG. 6 shows the example display of FIG. 5 displaying an example stop message.

In some examples, the display circuitry 410 causes the display 204 to display a message when a stop event is triggered. For example, if the relays 304, 306, the display circuitry 410 can cause the display 204 to present the message "STOP" as shown in FIG. 6. This alerts a user that an emergency stop has occurred. Additionally or alternatively, the display circuitry 410 can cause the display 204 to change colors in response to the parameter value satisfying the threshold value. For example, during normal operation, the background of the display 204 may be green. However, if the parameter value satisfies the threshold value and a safety stop event is triggered, the display circuitry 410 causes the background of the display 204 to switch to red.

In the illustrated example the output devices circuitry 412 controls (e.g., activates) the output device(s) 312 during a safety stop event. For example, the output device(s) 312 can include a buzzer and/or a light. If a safety stop event is triggered, the output device circuitry 412 can activate the output device(s) 312. This provides an indication or alert to the user that a safety stop event has occurred.

Figure 7:
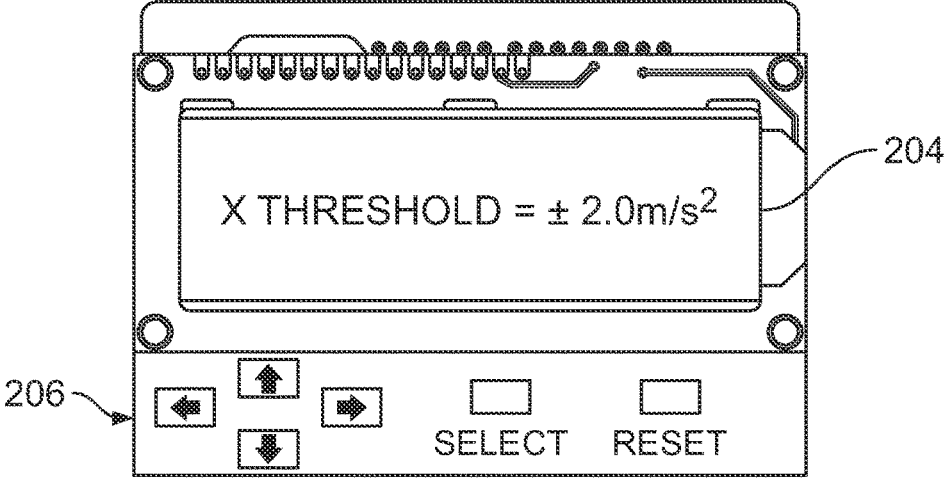
FIG. 7 shows the example display of FIG. 5 displaying an example acceleration threshold value.

As mentioned above, in some examples, a user can set the threshold values for the acceleration and/or jerk values for each of the X, Y, and Z directions. In some examples, the user can input and/or set the thresholds using the user input device 206. For example, in FIG. 7, the display 204 shows the current acceleration threshold value for the X direction. The user can press the buttons of the user input device 206 to increase or decrease the threshold value. Once the new threshold is set, the threshold manager circuitry 402 stores the threshold value in the memory 416. Therefore, the threshold manager circuitry 402 sets the threshold value based on input from a user. The user can similarly set the other acceleration and/or jerk threshold values. In other examples, one or more of the threshold values may be pre-set and may not be changed.

In some examples, the threshold manager circuitry 402 determines or sets the threshold value(s) based on the nominal or normal acceleration and/or jerk values during the process performed by the robot 102. For example, the threshold manager circuitry 402 can record (in the memory 416) the acceleration and jerk values over a period of time, such as during one cycle of the process performed by the robot 102. Assume for example the accelerometer 300 measures a maximum acceleration in the X direction of ±2.0 m/s$^2$ during this period of time. The threshold manager circuitry 402 then sets the X threshold value at a certain percentage above the maximum acceleration, such as 10%. Therefore the threshold manager circuitry 402 sets the threshold value for the acceleration in the X direction to be ±2.2 m/s$^2$. As such, any abnormal acceleration occurring outside of the nominal range would trigger the safety stop event. The threshold manager circuitry 402 can similarly set the threshold values for the other acceleration and jerk values.

In some examples, a user can change the sensitivity level of this threshold setting process. For example, the user can interact with the user input device 206 to increase or decrease the percentage. For instance, assume the user increases the sensitivity. This lowers the percentage above the maximum acceleration value where the threshold is set. For example, increasing the sensitivity may decrease the percentage to 5%, such that the threshold value for the X acceleration is now at 2.1 m/s$^2$. As such, the collision detection device 104 is more sensitivity to accelerations outside the nominal range. Conversely, the user can decrease the sensitivity, which increases the percentage. For example, decreasing the sensitivity may increase the percentage to 20%, such that the threshold value for the X acceleration is now at 2.4 m/s$^2$. In some examples, the user can select between two or more pre-set sensitivity levels, such as a high (e.g., 0% above the maximum), medium (e.g., 10% above the maximum), and low (e.g., 20% above the maximum). Additionally or alternatively, the user can specifically set the percentage number. The user can similarly set the sensitivity levels for the other acceleration and/or jerk threshold values.

In some examples, the safety circuit 122 includes emergency stop circuitry and safeguard stop circuitry. If the emergency stop circuitry is triggered or tripped, the robot 102 is stopped. If the safeguard stop circuitry is triggered or tripped, the robot 102 is slowed but not necessarily stopped. In some examples, the relays 304, 306 are electrically coupled to the emergency stop circuitry. As such, triggering the relays 304, 306 causes the robot 102 to stop. In other examples, the relays 304, 306 are electrically coupled to the safeguard stop circuitry. As such, triggering the relays 304, 306 causes the robot 102 to slow but not necessarily stop. In some examples, the collision detection device 104 includes one or more relays electrically coupled to the emergency stop circuitry and one or more relays electrically coupled to the safeguard stop circuitry. Therefore, in some instances, the relay trigger circuitry 406 can trigger the relay(s) to trip the emergency stop circuitry to completely stop the robot 102, and in other instances, the relay trigger circuitry 406 can trigger the relay(s) to trip the safeguard stop circuitry to slow but not stop the robot 102 (which may be referred to as "protective stop"). In some examples, the collision detection circuitry 302 determines whether to perform an emergency stop or a protective stop based on the amount by which the parameter value exceeds the threshold value. For example, if the acceleration value exceeds the threshold value by a small amount (e.g., less than 10%), the relay trigger circuitry 406 triggers the protective stop to slow the robot 102. If the acceleration value exceeds the threshold value by a larger amount (e.g., over 10%), the relay trigger circuitry 406 triggers the emergency stop.

Figure 8:
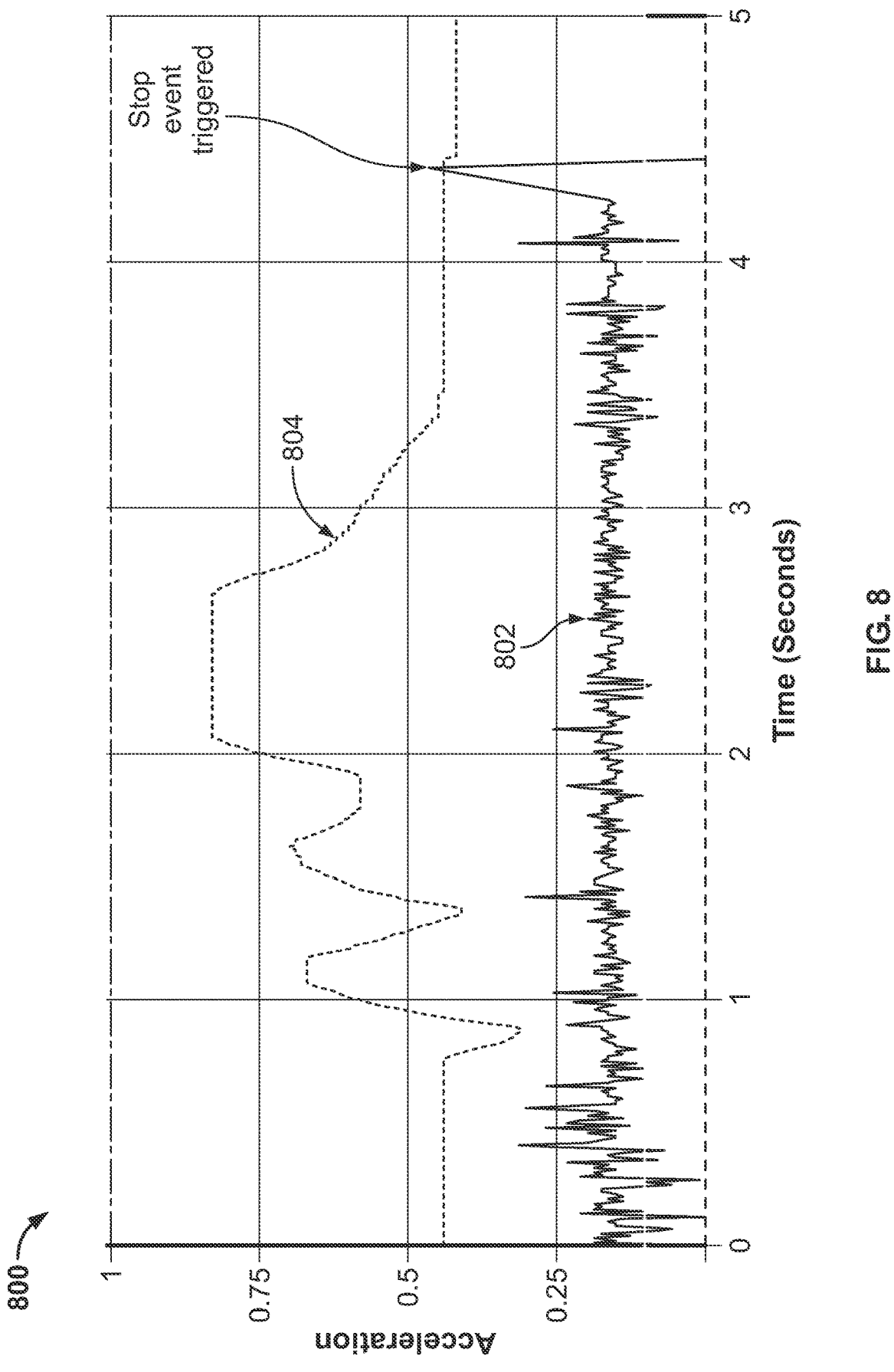
FIG. 8 is a graph showing example acceleration data and an example threshold.

FIG. 8 is an example graph 800 showing the monitored acceleration value 802 in the X direction as detected by the accelerometer 300 over a period of time. The graph also shows an example threshold value 804. The acceleration and threshold values 802, 804 have been normalized in the example graph 800. In this example, the threshold value 804 is changing. This may occur as the user changes the threshold value. At about 4.5 seconds, the acceleration value 802 exceeds the threshold value 804. This may be indicative of a collision of the robot 102 with an object and/or person. At such time, the relay trigger circuitry 406 triggers (e.g., opens) the relays 304, 306, which triggers the safety stop event. This prevents or reduces damage and/or injury to the object, person, and/or the robot 102. This manner of detecting a potential collision is more sensitive than known safety features implemented in the robot 102.

Figure 9:
FIG. 9 is block diagram of the example collision detection device of FIG. 1 including an example microphone.

In some examples, the sensor 300 can be implemented by another type of sensor. For example, FIG. 9 shows the block diagram of the example collision detection device 104. However, in this example, the collision detection device 104 includes a sensor 900 that is implemented by a microphone, referred to herein as the microphone 900. The microphone 900 measures noise or sound The microphone 900 can be implemented by any type of microphone. In general, if a collision occurs between the robot 102 and an object or person, it typically produces a loud or at least distinctive audible noise or sound. This noise or sound can be used to trigger a safety stop event. Therefore, in this example, the parameter value that is determined and compared a threshold value is the noise or sound energy (e.g., decibels (db)). If the sound energy satisfies a certain threshold value (e.g., 100 db), the collision detection circuitry 302 triggers (e.g., open) the relays 304, 306, which causes a safety stop event. As such, the collision detection device 104 can quickly and preemptively stop the robot 102 to reduce or limit damage and/or injury caused by a collision. Similar to the acceleration and jerk examples disclosed above, in some examples, a user can interact with the user input device 206 to set (e.g., increase or decrease) the threshold. In some examples, the user input device 206 may include a potentiometer, which is a knob used to control the gain of the microphone 900. This can be used to increase or decrease the level at which the measured sound exceeds the threshold value.

Furthermore, the microphone 900 enables a user to stop the robot 102 before a collision occurs. For example, the user can yell or make a loud sound (e.g., by clapping), which exceeds the sound energy threshold and causes the robot 102 to stop. As an example, the user can be watching the robot 102 from the other side of the room. If the user suspects the robot 102 may collide with an object, the user can yell (e.g., "stop"), which exceeds the sound threshold and causes the robot 102 to stop. Therefore, the example collision detection device 104 can be used to prevent a collision before it occurs.

In some examples in which the microphone 900 is used, the collision detection device 104 can be disposed near the robot 102 but not coupled to the robot 102. Therefore, the collision detection device 104 can be placed on the table 106 or another location that is near the robot 102.

Figure 10:
FIG. 10 is block diagram of the example collision detection device of FIG. 1 including an example accelerometer and an example microphone.

In some examples, the collision detection device 104 can include both the accelerometer 300 and the microphone 900. For example, FIG. 10 is a block diagram of the collision detection device 104 including both the accelerometer 300 and the 900. The collision detection circuitry 302 can monitor both the acceleration values and sound energy simultaneously. If either parameter value satisfies its corresponding threshold value, a safety stop event is triggered.

While an example manner of implementing the collision detection circuitry of FIG. 3 is illustrated in FIG. 4, one or more of the elements, processes, and/or devices illustrated in FIG. 4 may be combined, divided, re-arranged, omitted, eliminated, and/or implemented in any other way. Further, the example parameter value determination circuitry 400, the example threshold manager circuitry 402, the example comparator circuitry 404, the example relay trigger circuitry 406, the example relay reset circuitry 408, the example display circuitry 410, the example output device circuitry 412, the example input device circuitry 414, and/or, more generally, the example collision detection circuitry 302 of FIG. 4, may be implemented by hardware alone or by hardware in combination with software and/or firmware. Thus, for example, any of the example parameter value determination circuitry 400, the example threshold manager circuitry 402, the example comparator circuitry 404, the example relay trigger circuitry 406, the example relay reset circuitry 408, the example display circuitry 410, the example output device circuitry 412, the example input device circuitry 414, and/or, more generally, the example collision detection circuitry 302, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example collision detection circuitry 302 of FIG. 4 may include one or more elements, processes, and/or devices in addition to, or instead of, those illustrated in FIG. 4, and/or may include more than one of any or all of the illustrated elements, processes and devices.

Figure 11:
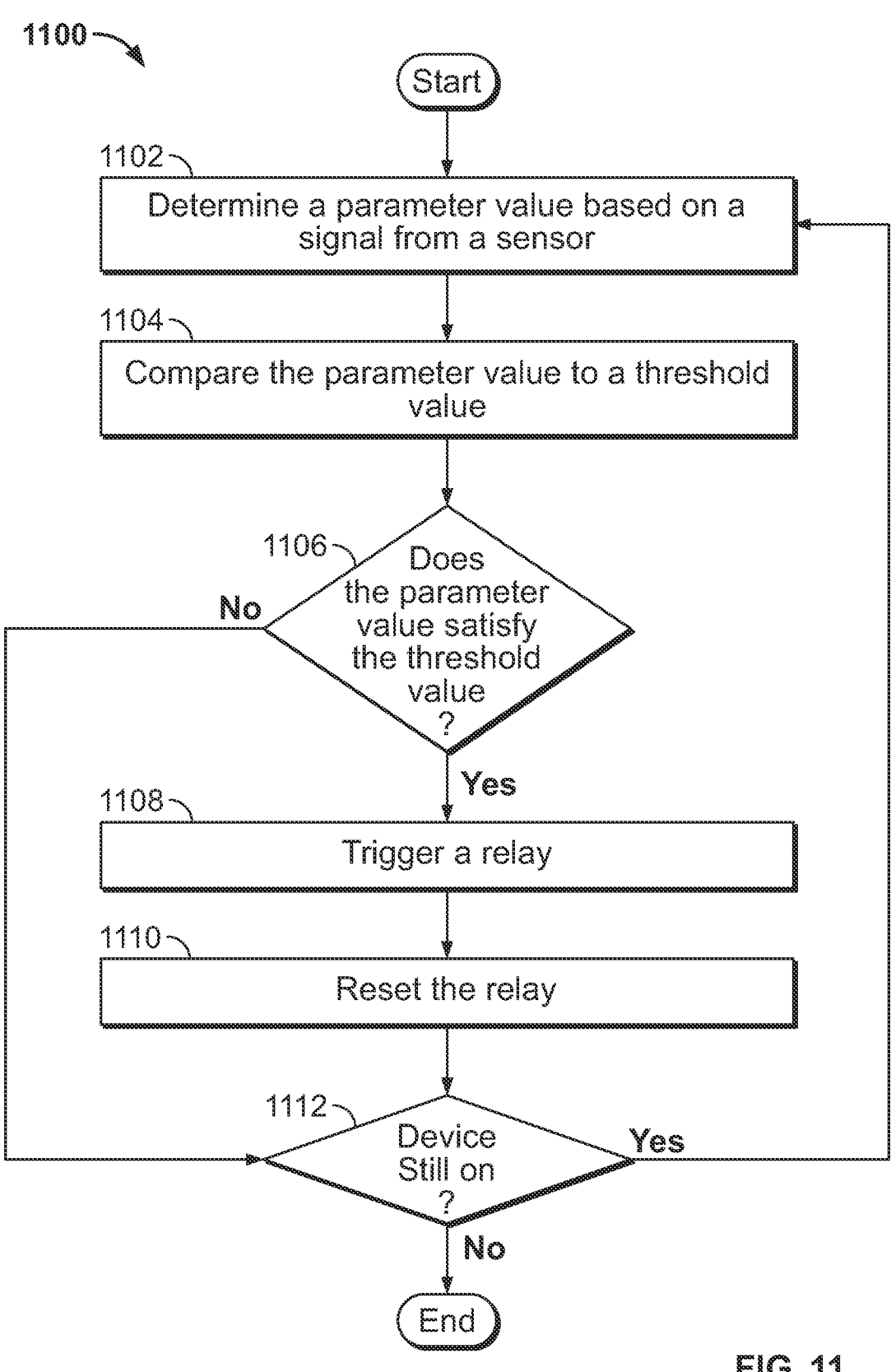
FIG. 11 is a flowchart representative of example machine readable instructions and/or example operations that may be executed by example processor circuitry to implement the example collision detection processor circuitry of FIG. 4.

A flowchart representative of example machine readable instructions, which may be executed to configure processor circuitry to implement the collision detection circuitry 302 of FIG. 4, is shown in FIG. 11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 11, many other methods of implementing the example collision detection circuitry 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions and/or example operations 1100 that may be executed and/or instantiated by processor circuitry to detect and/or avoid a collision of a robot with an object. For clarity, the example machine readable instructions and/or the operations 1100 are described in connection with the parameter value being an acceleration value in the X direction. However, it is understood that the example machine readable instructions and/or the operations 1100 could be similarly implemented in connection with other parameter values, such as the acceleration values in the Y and Z directions, jerk values in the X, Y, and Z directions, and/or sound.

The machine readable instructions and/or the operations 1100 of FIG. 11 begin at block 1102, at which the parameter value determination circuitry 400 determines a parameter value, such as acceleration in the X direction, based on a signal from a sensor, such as the accelerometer 300. In some examples, the display circuitry 410 causes the display 204 to display the acceleration value in the X direction.

At block 1104, the comparator circuitry 404 compares the parameter value (the acceleration in the X direction) to a threshold value. As disclosed herein, in some examples, the threshold manager circuitry 402 sets the threshold value based on input from a user. Additionally or alternatively, the threshold value can be determined and set by the threshold manager 402 based on the nominal range of acceleration in the X direction during the process performed by the robot 102. In some examples, the user can increase or decrease the sensitivity of the threshold.

At block 1106, the comparator circuitry 404 determines if the parameter value satisfies (e.g., meets or exceeds) the threshold value. If the robot 102 collides with an object, for instance, the collision may produce a relatively high acceleration value in the X direction. If the comparator circuitry 404 determines the parameter value satisfies the threshold value, the relay trigger circuitry 406, at block 1108, triggers the first and second relays 304, 306. In some examples, triggering the relays 304, 306 causes the relays 304, 306 to open. This creates an open circuit at the safety circuit 122 of the robot 102. As such, the robot 102 is stopped, which prevents or reduces damage from the collision.

In some examples, in addition to triggering the relays, the display circuitry 410 may cause the display 204 to provide a message or alert that a safety stop event has occurred, such as display the message "STOP" or changing colors of the display 204. Additionally or alternatively, the output device circuitry 412 can active the output device(s) 312.

At block 1110, the relay reset circuitry 408 resets the relays 304, 306. In some examples, the relay reset circuitry rests the relays 304, 306 after a period of time since the relays 304, 306 were triggered. In some examples, the period of time is 30 seconds. In other examples, the period of time can be longer or shorter. In some examples, the relay reset circuitry 408 resets the relays 304, 306 in response to user input. For example, the user may press a button on the user input device 206 to initiate the relay reset.

Referring back to block 1106, if the comparator circuitry 404 determines the parameter value does not satisfy the threshold value, the parameter value determination circuitry 400, at block 1112, determines whether the collision detection device 104 is still on. If the collision detection device 104 is still on and operating, control proceeds back to block 1102 at the collision detection circuitry 302 continues to monitor or track the parameter value based on new signals from the sensor. In some examples, this process is represented at a relatively high frequency, such as 16 Mhz. Otherwise, if the collision detection device 104 is turned off, the example process ends.

As disclosed above, the example process of FIG. 11 can be similarly implemented in connection with other parameter values, such as the acceleration value in the Y direction, the acceleration in the Z direction, the jerk value in the X direction, the jerk value in the Y direction, and/or the jerk value in the Z direction. Also, the example process of FIG. 11 can be implemented in connection with sound or noise, such as by using the microphone 900 from FIGS. 9 and 10.

In some examples, multiple parameter values are determined and monitored simultaneously. If one or more other parameter values satisfies its corresponding threshold, a stop event is triggered.

Figure 12:
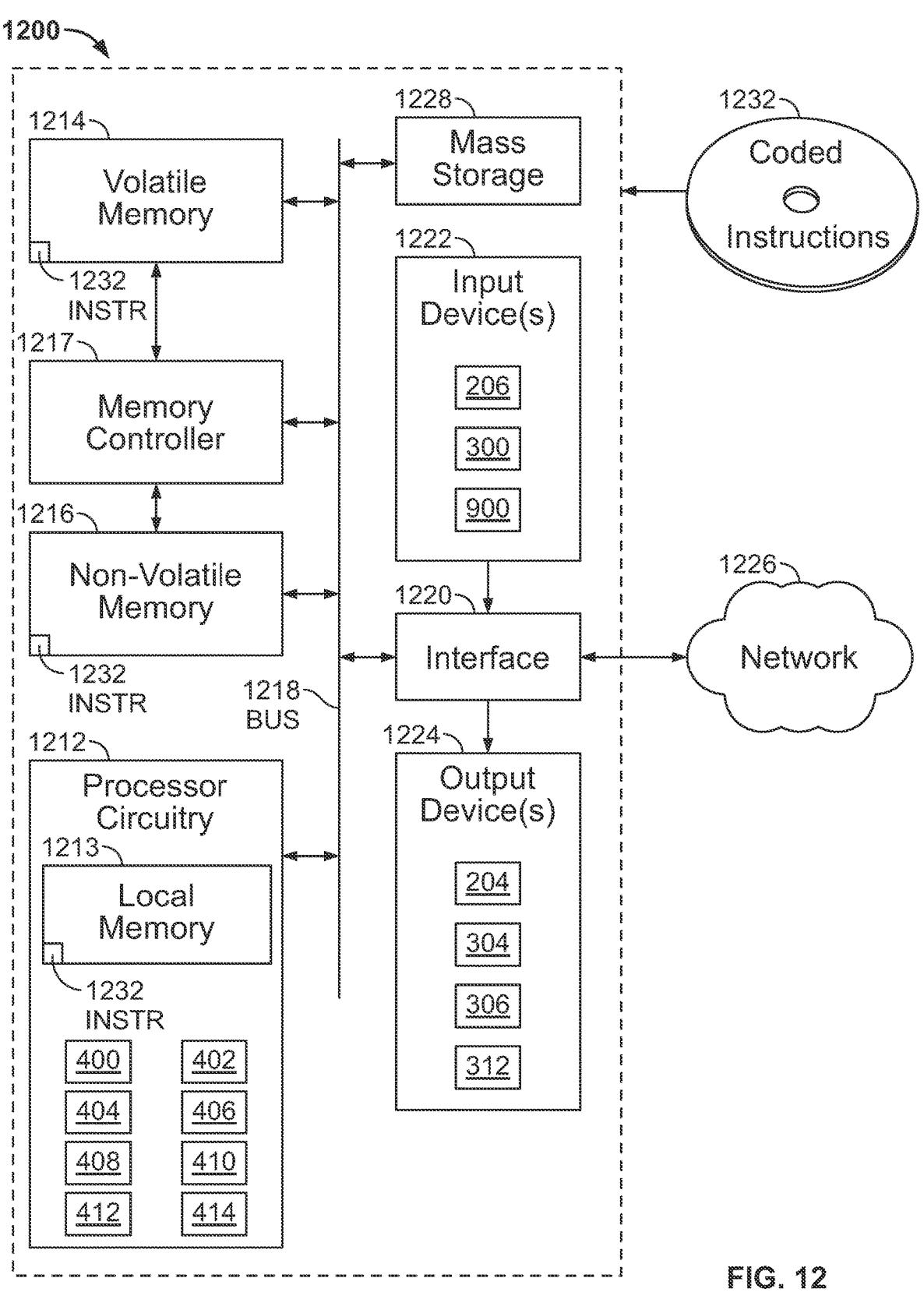
FIG. 12 is a block diagram of an example processing platform including processor circuitry structured to execute the example machine readable instructions and/or the example operations of FIG. 11 to implement the example collision detection processor circuitry of FIG. 4.

FIG. 12 is a block diagram of an example processor platform 1200 structured to execute and/or instantiate the machine readable instructions and/or the operations of FIG. 11 to implement the collision detection circuitry of FIG. 4. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example parameter value determination circuitry 400, the example threshold manager circuitry 402, the example comparator circuitry 404, the example relay trigger circuitry 406, the example relay reset circuitry 408, the example display circuitry 410, the example output device circuitry 412, and the example input device circuitry 414.

The processor circuitry 1212 of the illustrated example includes a local memory 1213 (e.g., a cache, registers, etc.), which may correspond to the memory 416 of FIG. 4. The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a device and/or a user to enter data and/or commands into the processor circuitry 1212. In some examples, the input device(s) 1222 include the sensors 300, 900 and the user input device 206. Additionally or alternatively, the input device(s) 422 can be implemented by, for example, an audio sensor, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. In some examples, the output device(s) 1224 include the display 204 (e.g., a light emitting diode (LED), an organic light emitting diode (OLED), a liquid crystal display (LCD), the first and second relays 304, 306, and the output device(s) 312. Additionally or alternatively, the output device(s) 1224 can be implemented, for example, by a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1232, which may be implemented by the machine readable instructions of FIGS. 11, may be stored in the mass storage device 1228, in the volatile memory 1214, in the non-volatile memory 1216, and/or on a removable non-transitory computer readable storage medium such as a CD or DVD.

FIG. 13 is a block diagram of an example implementation of the processor circuitry 1212 of FIG. 12. In this example, the processor circuitry 1212 of FIG. 12 is implemented by a microprocessor 1300. For example, the microprocessor 1300 may be a general purpose microprocessor (e.g., general purpose microprocessor circuitry). The microprocessor 1300 executes some or all of the machine readable instructions of the flowchart of FIG. 11 to effectively instantiate the circuitry of FIG. 4 as logic circuits to perform the operations corresponding to those machine readable instructions. In some such examples, the circuitry of FIG. 4 is instantiated by the hardware circuits of the microprocessor 1300 in combination with the instructions. For example, the microprocessor 1300 may be implemented by multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowchart of FIG. 11.

The cores 1302 may communicate by a first example bus 1304. In some examples, the first bus 1304 may be implemented by a communication bus to effectuate communication associated with one(s) of the cores 1302. For example, the first bus 1304 may be implemented by at least one of an Inter-Integrated Circuit (I2C) bus, a Serial Peripheral Interface (SPI) bus, a PCI bus, or a PCIe bus. Additionally or alternatively, the first bus 1304 may be implemented by any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the local memory 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may be implemented by at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
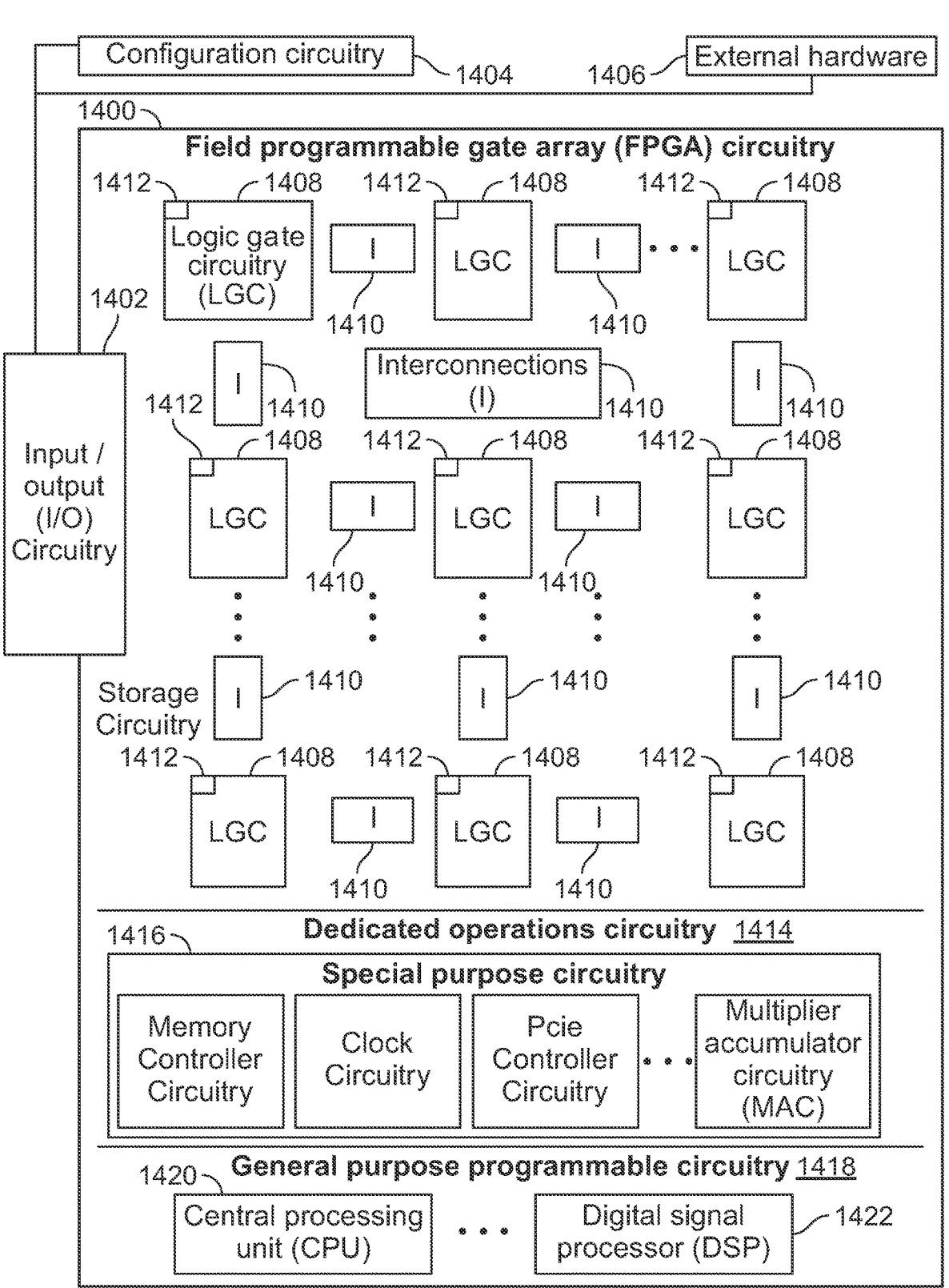
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowchart of FIG. 11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowchart of FIG. 11. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowchart of FIG. 11. As such, the FPGA circuitry 1400 may be structured to effectively instantiate some or all of the machine readable instructions of the flowchart of FIG. 11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIG. 11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware 1406. For example, the configuration circuitry 1404 may be implemented by interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may be implemented by external hardware circuitry. For example, the external hardware 1406 may be implemented by the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations that may correspond to at least some of the machine readable instructions of FIG. 11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 6. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowchart of FIG. 11 may be executed by one or more of the cores 1302 of FIG. 13, a second portion of the machine readable instructions represented by the flowchart of FIG. 11 may be executed by the FPGA circuitry 1400 of FIG. 14, and/or a third portion of the machine readable instructions represented by the flowchart of FIG. 11 may be executed by an ASIC. It should be understood that some or all of the circuitry of FIG. 4 may, thus, be instantiated at the same or different times. Some or all of the circuitry may be instantiated, for example, in one or more threads executing concurrently and/or in series. Moreover, in some examples, some or all of the circuitry of FIG. 4 may be implemented within one or more virtual machines and/or containers executing on the microprocessor.

In some examples, the processor circuitry 1212 of FIG. 12 may be in one or more packages. For example, the microprocessor 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that prevent or reduce impact of a collision of an automated robot (e.g., a cobot) with an object and/or person. As such, the examples disclosed herein are beneficial for non-contact automation where contact with an object can cause damage. Examples disclosed herein also improve safety to persons working in the area around a robot. The examples disclosed herein are independent or agnostic to the main control system of a robot. As such, example devices disclosed herein can be easily and quickly integrated with an existing robot. The examples disclosed herein are also more sensitive than known safety features in known robots. As such, examples disclosed herein can trigger a safety stop even more quickly than known safety features.

Examples and combinations of examples disclosed herein include the following:

Example 1 is a collision detection device comprising a housing, the housing to be coupled to an automated robot, a sensor in the housing, a relay in the housing, the relay to be electrically coupled to a safety circuit of the automated robot, and circuitry in the housing. The circuitry is to determine a parameter value based a signal from the sensor, compare the parameter value to a threshold value, and, in response to the parameter value satisfying the threshold value, trigger the relay to stop the automated robot.

Example 2 includes the collision detection device of Example 1, wherein the collision detection device is independent of a control system associated with the automated robot.

Example 3 includes the collision detection device of Examples 1 or 2, wherein the circuitry includes a microprocessor.

Example 4 includes the collision detection device of any of Examples 1-3, wherein the circuitry is to reset the relay after a period of time.

Example 5 includes the collision detection device of any of Examples 1-4, wherein the sensor is an accelerometer.

Example 6 includes the collision detection device of Example 5, wherein the parameter value is an acceleration value.

Example 7 includes the collision detection device of Example 6, further including a display, the circuitry to cause the display to display the acceleration value.

Example 8 includes the collision detection device of Example 7, wherein the circuitry is to cause the display to change colors in response to the parameter value satisfying the threshold value.

Example 9 includes the collision detection device of any of Examples 5-8, wherein the accelerometer is to output signals indicative of acceleration in X, Y, and Z directions, and wherein the circuitry is to determine acceleration values for the X, Y, and Z directions, compare the acceleration values to respective threshold values, and, in response to one of the acceleration values satisfying the respective threshold value, trigger the relay to stop the automated robot.

Example 10 includes the collision detection device of any of Examples 5-9, wherein the parameter value is a change in acceleration.

Example 11 includes the collision detection device of any of Examples 1-4, wherein the sensor is a microphone, and wherein the parameter value is sound energy.

Example 12 is a method comprising determining, via a processor, a parameter value based on a signal from a sensor, wherein the sensor, the processor, and a relay are disposed in a housing that is coupled to an automated robot, the relay electrically coupled to a safety circuit of the automated robot, comparing, via the processor, the parameter value to a threshold value, and, in response to the parameter value satisfying the threshold value, triggering, via the processor, the relay to stop the automated robot.

Example 13 includes the method of Example 12, wherein the sensor is an accelerometer, and wherein the parameter value includes at least one of an acceleration value or a change in acceleration value.

Example 14 includes the method of Example 12, wherein the sensor is a microphone, and wherein the parameter value is sound energy.

Example 15 includes the method of any of Examples 12-14, wherein the automated robot is a collaborative robot.

Example 16 is a non-transitory machine readable storage medium comprising instructions that, when executed, cause processor circuitry to at least determine a parameter value based on a signal from a sensor, wherein the sensor, the processor circuitry, and a relay are disposed in a housing that is coupled to an automated robot, the relay electrically coupled to an emergency stop circuit of the automated robot, compare the parameter value to a threshold value, and, in response to the parameter value satisfying the threshold value, trigger the relay to stop the automated robot.

Example 17 includes the non-transitory machine readable storage medium of Example 16, wherein the parameter value includes at least one of an acceleration value, a change in acceleration value, or sound energy.

Example 18 includes the non-transitory machine readable storage medium of Examples 16 or 17, wherein the instructions, when executed cause the processor circuitry to determine the threshold value based on a nominal range of acceleration during a process performed by the automated robot.

Example 19 includes the non-transitory machine readable storage medium of any of Examples 16-18, wherein the instructions, when executed, cause the processor circuitry to set the threshold value based on input from a user.

Example 20 includes the non-transitory machine readable storage medium of any of Examples 16-19, wherein the instructions, when executed, cause the processor circuitry to reset the relay after a period of time.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A collision detection device comprising:
   a housing, the housing to be coupled to an automated robot;
   a sensor in the housing;
   a first relay and a second relay in the housing, the first relay and the second relay to be electrically coupled to a safety circuit of the automated robot;
   machine-readable instructions; and
   at least one processor circuit to execute the machine-readable instructions to:
     determine a parameter value based a signal from the sensor;
     perform a comparison of the parameter value to a threshold value;
     determine, based on the comparison, that (a) the parameter value exceeds the threshold value by or less than a first amount or (b) the parameter value exceeds the threshold value by more than the first amount;
     when the parameter value exceeds the threshold value by or less than the first amount, trigger the first relay to cause a speed of movement of the automated robot to be reduced without stopping the automated robot; and
     when the parameter value exceeds the threshold value by more than the first amount, trigger the second relay to stop the automated robot.

2. The collision detection device of claim 1, wherein the collision detection device is independent of a control system associated with the automated robot.

3. The collision detection device of claim 1, wherein the one or more of the at least one processor circuit includes a microprocessor in the housing.

4. The collision detection device of claim 1, wherein when the second relay is triggered, one or more of the at least one processor circuit is to cause the second relay to be reset after a period of time.

5. The collision detection device of claim 1, wherein the sensor is an accelerometer.

6. The collision detection device of claim 5, wherein the parameter value is an acceleration value.

7. The collision detection device of claim 6, further including a display, wherein one or more of the at least one processor circuit is to cause the display to present the acceleration value.

8. The collision detection device of claim 7, wherein one or more of the at least one processor circuit is to cause an interface of the display to change colors in response to the parameter value exceeding the threshold value by more than the first amount.

9. The collision detection device of claim 5, wherein the accelerometer is to output signals indicative of acceleration in X, Y, and Z directions, and wherein one or more of the at least one processor circuit is to:

determine acceleration values for the X, Y, and Z directions;

compare the acceleration values to respective threshold values; and in response to one of the acceleration values exceeding the respective threshold value by more than the first amount, trigger the second relay to stop the automated robot.

10. The collision detection device of claim 5, wherein the parameter value is a change in acceleration.

11. The collision detection device of claim 1, wherein the sensor is a microphone, and wherein the parameter value is sound energy.

12. A method comprising:

determining, by at least one processor circuit programmed by at least one instruction, a parameter value based on a signal from a sensor, wherein the sensor, a first relay, and a second relay are disposed in a housing that is coupled to an automated robot, the first relay and the second relay electrically coupled to a safety circuit of the automated robot;

performing, by one or more of the at least one processor circuit, a comparison of the parameter value to a threshold value;

determining, based on the comparison and by one or more of the at least one processor circuit, an amount by which the parameter value satisfies the threshold value; and based on the amount, one of (a) triggering, by one or more of the at least one processor circuit, the first relay to stop the automated robot, or (b) triggering, by one or more of the at least one processor circuit, the second relay to cause a speed of movement of the automated robot to be adjusted without stopping the automated robot.

13. The method of claim 12, wherein the sensor is an accelerometer, and wherein the parameter value includes at least one of an acceleration value or a change in acceleration value.

14. The method of claim 12, wherein the sensor is a microphone, and wherein the parameter value is sound energy.

15. The method of claim 12, wherein the automated robot is a collaborative robot.

16. A non-transitory machine-readable storage medium comprising machine-readable instructions that are to cause at least one processor circuit to at least:

determine a parameter value based on a signal from a sensor, wherein the sensor, a first relay, and a second relay are disposed in a housing that is coupled to an automated robot, the first relay and the second relay electrically coupled to an emergency stop circuit of the automated robot;

perform a comparison of the parameter value to a threshold value;

determine, based on the comparison, that (a) the parameter value exceeds the threshold value by a first amount or (b) the parameter value exceeds the threshold value by a second amount, the second amount greater than the first amount;

when the parameter value exceeds the threshold value by the first amount, trigger the first relay to cause a speed of movement of the automated robot to be reduced without stopping the automated robot; and when the parameter value exceeds the threshold value by the second amount, trigger the second relay to stop the automated robot.

17. The non-transitory machine-readable storage medium of claim 16, wherein the parameter value includes at least one of an acceleration value, a change in acceleration value, or sound energy.

18. The non-transitory machine-readable storage medium of claim 16, wherein the machine-readable instructions are to cause one or more of the at least one processor circuit to determine the threshold value based on a nominal range of acceleration during a process performed by the automated robot.

19. The non-transitory machine-readable storage medium of claim 16, wherein the machine-readable instructions are to cause one or more of the at least one processor circuit to set the threshold value based on input from a user.

20. The non-transitory machine-readable storage medium of claim 16, wherein when the second relay is triggered, the machine-readable instructions are to cause one or more of the at least one processor circuit to cause the second relay to be reset after a period of time.

\* \* \* \* \*